May 16, 1967 F. KNOCHENHAUER ET AL 3,320,492
MEANS FOR AUTOMATICALLY STOPPING SOUND REPRODUCTION
Filed July 13, 1964
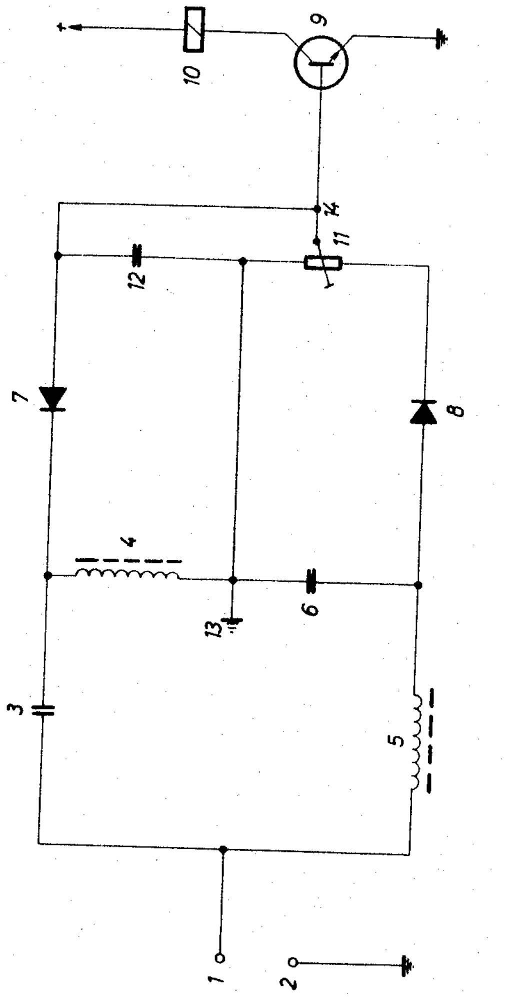
INVENTORS
FRIEDRICH KNOCHENHAUER
SIEGFRIED APITZ 3,320,492

MEANS FOR AUTOMATICALLY STOPPING SOUND REPRODUCTION

Friedrich Knochenhauer and Siegfried Apitz, Altena, Westphalia, Germany, assignors to International Standard Electric Corporation, New York, N.Y., a corporation of Delaware Filed July 13, 1964, Ser. No. 382,114
Claims priority, application Germany, July 20, 1963, St 20,884
4 Claims. (Cl. 317—147)

This invention relates to sound recording apparatus, and, more particularly, to means for automatically stopping reproduction of a recording.

In sound recorders, such as tape recorders, it is often desired to be able to automatically interrupt reproduction at points determined during recording. It may be desired to stop playback and also initiate a rewind operation in order to continuously repeat a recorded message. Just stopping reproduction may be required where an interruption is to be made for any suitable length of time during broadcasting so that commercials can be interposed. In order to identify the points at which the recording is ot stop, it is known to store a signal in the recording which will be picked up during reproduction and operate means for stopping of the reproduction. In known arrangements, a frequency is usually used which is beneath or above the transmission range so that a larger bandwidth is required than for just reproduction. It has also been suggested to use FM signals during AM reproduction, but here expensive apparatus is needed to detect the FM. Finally, it is known to produce a particular frequency within the reproduction bandwidth. However, stopping is effected only if the frequency is held long enough for the system to react in order to distinguish the identification signal from the occurrence of the frequency during normal transmission. Using this system, more time is required than if just the presence of the signal itself could be detected.

It is therefore an object of this invention to provide an arrangement for stopping sound recording apparatus which avoids the disadvantages of the prior art.

Another object of this invention is to provide apparatus for rapidly stopping reproduction of recording apparatus in response to a signal within the frequency band of the recording.

A feature of our invention is the use of means for comparing the components of the recording which have frequencies above a first desired level with the components of the recording having a frequency below a second desired level, the second level being lower than the first level. Switching means are connected to the comparing means in such a manner that only when both a control signal, which consists of a signal having a frequency beneath the second desired level of frequencies, and when no signals above said first desired level are compared will the switching means be operated.

The above-mentioned and other features and objects of this invention will become more apparent by reference to the following description taken in conjunction with the accompanying drawing in which there is shown a schematic representation of a basic circuit in accordance with our invention.

Referring to the drawing, the reproduction or playback voltage is applied across terminals 1, 2 via a high-pass filter comprising capacitor 3 and inductor 4 and a low-pass filter comprising inductor 5 and capacitor 6 to rectifiers 7 and 8. The rectifiers are connected to the base of transistor 9 which controls a relay 10 in that when current flows through the transistor, relay 10 is activated to effect a desired operation such as stopping of the reproduction. Variable resistor 11 may be used to adjust the point at which current will flow. The voltages due to current flowing through the low-pass and high-pass filters tend to cancel each other out at resistor 11. Capacitor 12 can be inserted to smooth the rectified alternating voltages.

Operation of an arrangement in accordance with our invention will now be explained with reference to the drawing. In the following example, it is assumed that a control signal of 50 c.p.s. is used. A high-pass filter (3, 4) is selected with a cut-off frequency of 500 c.p.s. and a low-pass filter (5, 6) is selected with a cut-off frequency of 100 c.p.s. It can be seen that frequencies between 100 and 500 c.p.s. will not pass applicants' filters at all. Frequencies above 500 c.p.s. will pass through filter 3, 4 to rectifier 7; then to resistor 11 and from there to ground 13. It can be seen that voltages due to frequencies above 500 c.p.s. will cause a negative voltage to be applied to resistor 11 via point 14. Therefore, when only frequencies above 500 c.p.s. are present, transistor 9 will not conduct as it is an NPN transistor which requires a positive voltage at its base for conductance to occur.

Frequencies below 100 c.p.s. will pass through filter 5, 6 to rectifier 8, and then via resistor 11 to ground 13. It can be seen by noting the direction of current flow that the voltage applied to resistor 11 due to frequencies below 100 c.p.s. will be positive. During normal transmission, both components below 100 c.p.s. and above 500 c.p.s. will always be present. The position of potentiometer 11 is so selected that the positive voltage produced at the potentiometer due to frequencies below 100 c.p.s. will be overcome or equalled by the negative potential produced due to components above 500 c.p.s. In this manner, a negative voltage or none at all is applied to the base of transistor 9 so that transistor 9 does not conduct during normal transmission. If only frequencies below 100 c.p.s. are transmitted during normal reproduction (for instance, when a base fiddle is being played) the harmonics produced will be above 500 c.p.s. so that the combined voltage will still be either negative or at least not positive enough to cause transistor 9 to conduct. Thus, it can be seen that if only signals above 500 c.p.s. are present, or signals above 500 c.p.s. and below 100 c.p.s. are present, or signals below 100 c.p.s. which have harmonics above 500 c.p.s., transistor 9 will not conduct. Only if a control signal below 100 c.p.s., which must be a pure signal, is received by our inventive arrangement will a positive voltage of sufficient amplitude be applied to the base of transistor 9 so that relay 10 is operated. Relay 10 can operate means for stopping reproduction or means for stopping reproduction and initiating a rewind. When the 50 c.p.s. control signal is detected, relay 10 will be operated as no frequencies above 500 c.p.s. will be detected.

While we have described above the principles of our invention in connection with specific apparatus, it is to be clearly understood that this description is made only by way of example and not as a limitation to the scope of our invention as set forth in the objects thereof and in the accompanying claims.

We claim:

1. A circuit arrangement for detecting a control signal during reproduction of a recording which control signal is within the frequency band of the reproduced recording, comprising:

a high pass filter connected to the input terminals of said circuit for passing frequencies above a first desired level;

a low pass filter connected to the input terminals of said circuit for passing frequencies below a second desired level which is lower than said first level;

a variable resistor connected to said high and low pass filters by means of oppositely poled rectifiers; and a switching transistor, the base of which is connected to the variable tapping point of said resistor the output of which controls a relay, whereby said variable resistor is adjusted to a value which turns on said switching transistor when said control signal having a frequency below said second level is detected at said resistor and when substantially no frequency above said first level is detected at said resistor.

2. An arrangement according to claim 1 including a smoothing capacitor connected between the base of said transistor and ground to smooth the rectified alternating voltages.

3. A circuit arrangement for detecting a control signal during reproduction of a recording which control signal is within the frequency band of the reproduced recording comprising:

a high pass filter connected to the input terminals of said circuit and tuned to pass frequencies above a first desired level;

a low pass filter connected to said terminals in parallel with said high pass filter and tuned to pass filter frequencies below a second desired level which is lower than said first level;

a common resistor having a variable tapping point connected to said high and low pass filters by means of oppositely polarized rectifiers, one rectifier connecting one terminal of said resistor to said low pass filter and another rectifier connecting said variable tapping point to said high pass filter;

a smoothing capacitor connected between said variable tapping point and the other terminal of said resistor in parallel to the input terminals of said circuit; and a switching transistor, the base of which is connected to said variable tapping point to adjust the set point of said transistor, and the collector of which is connected to a source of potential thru a relay responsive to said transistor, whereby said variable resistor is adjusted to a value which turns on said switching transistor to activate said relay when the voltage at the base of said transistor has a frequency below said second level and substantially no frequencies above said first level.

4. An arrangement according to claim 3 in which said low and high pass filters each comprise a series connected inductor and capacitor.

References Cited by the Examiner

UNITED STATES PATENTS

| | | | |
|---|---|---|---|
| 2,802,939 | 8/1957 | Klehfoth | 325—477 X |
| 2,834,879 | 5/1958 | Bauman | 317—147 X |
| 2,951,973 | 9/1960 | Atkinson | 317—147 |
| 2,961,613 | 11/1960 | Zschner | 333—70 X |
| 3,076,939 | 2/1963 | Wycoff | 325—477 X |

MILTON O. HIRSHFIELD, *Primary Examiner.*

I. A. SILVERMAN, *Assistant Examiner.*